Dec. 29, 1964            H. O. EGLI            3,162,955
GAGE BLOCK ASSEMBLY FASTENING DEVICES
Filed April 4, 1961            4 Sheets-Sheet 1
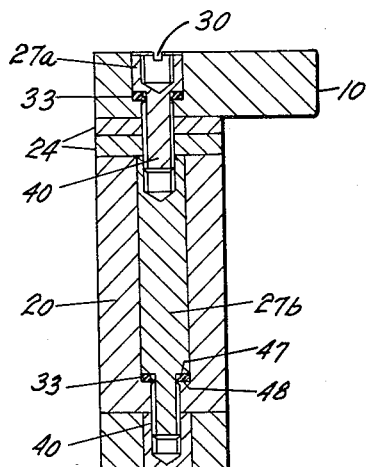
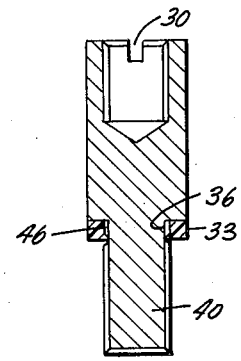
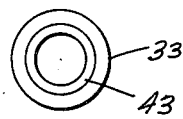
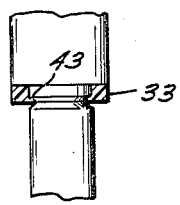
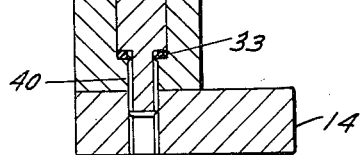
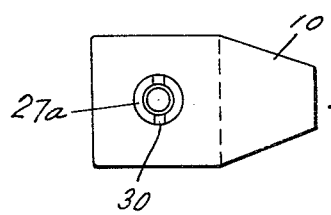
INVENTOR.
HENRY O. EGLI
BY
OSTROLENK, FABER, GERB & SOFFEN
ATTORNEYS

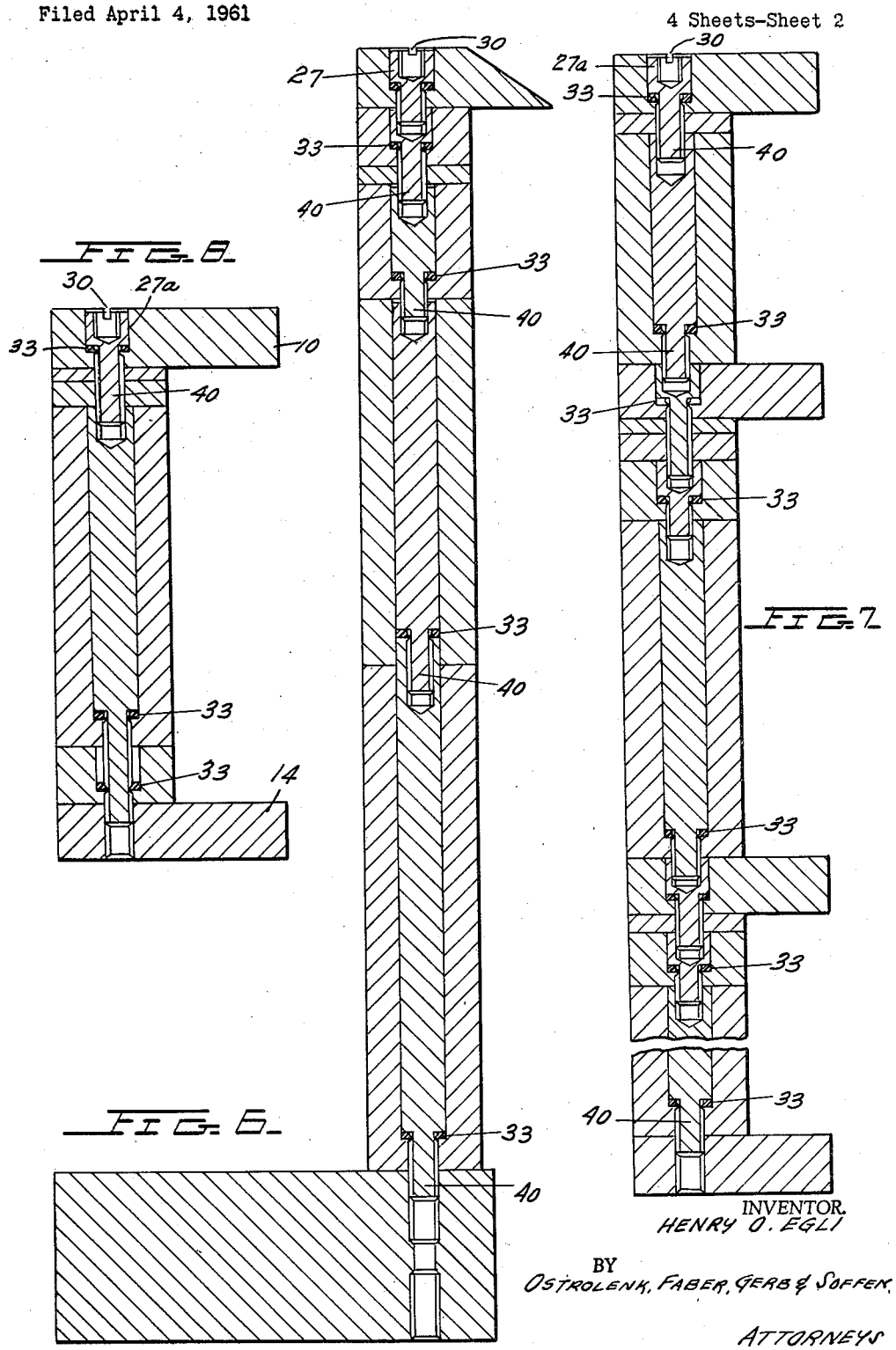

Dec. 29, 1964    H. O. EGLI    3,162,955
GAGE BLOCK ASSEMBLY FASTENING DEVICES
Filed April 4, 1961    4 Sheets-Sheet 3

INVENTOR.
HENRY O. EGLI
BY
OSTROLENK, FABER, GERB & SOFFEN
ATTORNEYS

Dec. 29, 1964 H. O. EGLI 3,162,955
GAGE BLOCK ASSEMBLY FASTENING DEVICES
Filed April 4, 1961 4 Sheets-Sheet 4
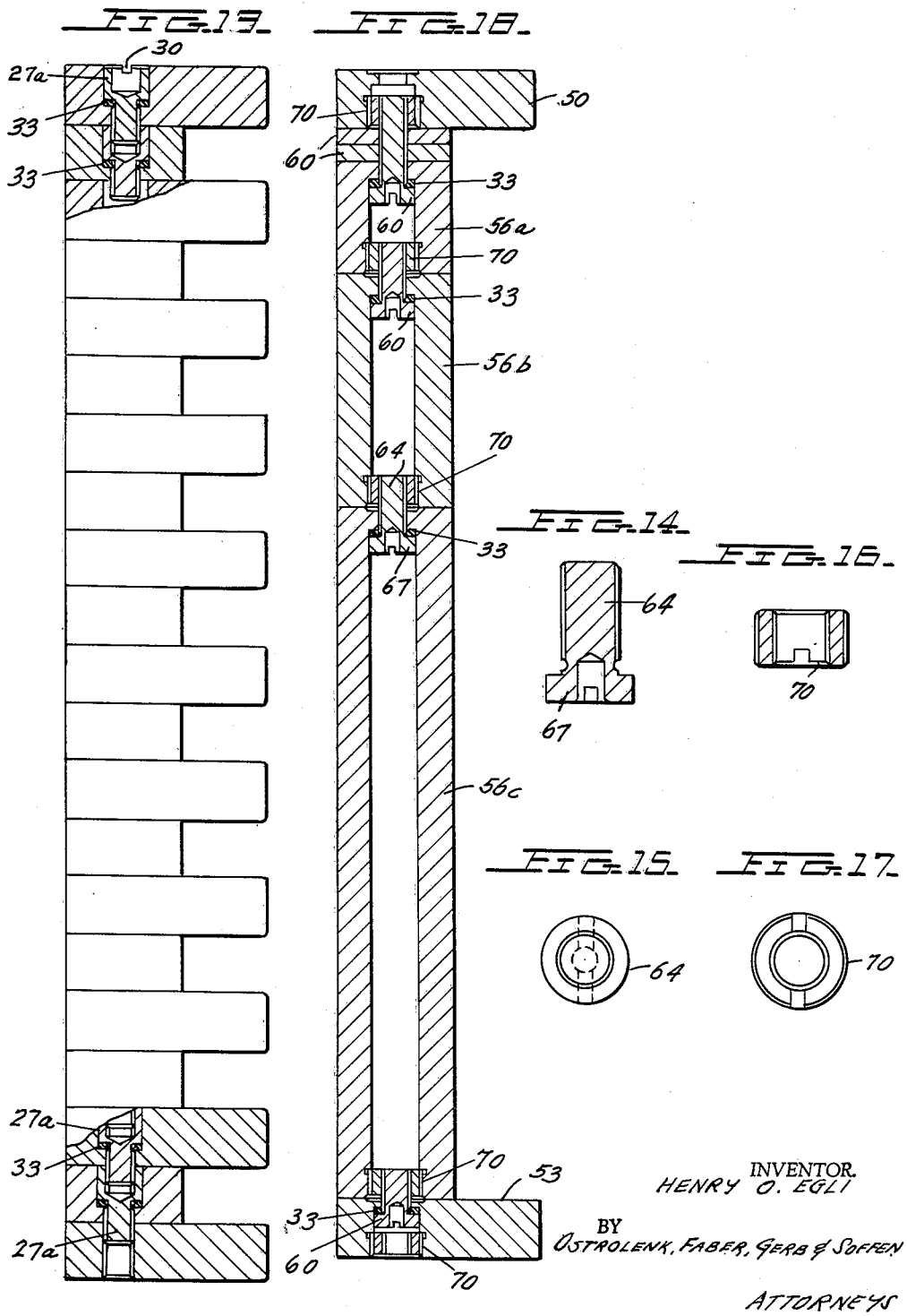
INVENTOR.
HENRY O. EGLI
BY
OSTROLENK, FABER, GERB & SOFFEN
ATTORNEYS

United States Patent Office 3,162,955
Patented Dec. 29, 1964

3,162,955
GAGE BLOCK ASSEMBLY FASTENING DEVICES
Henry O. Egli, Riverside Drive, Sidney, N.Y.
Filed Apr. 4, 1961, Ser. No. 100,671
12 Claims. (Cl. 33—168)

This invention relates to gage blocks and more particularly to devices for securing a plurality of blocks together for various purposes and uses.

In my previous Patent 2,766,531, issued October 16, 1956, there is disclosed an assembly of gage blocks secured in compressive stress by hermaphrodite bolts. Such arrangement is satisfactory for short blocks and relatively short bolts passing therebetween. Where, however, relatively long blocks are used with elongated fastening members extending therethrough from block to block, difficulty arises due to assembly under uncontrolled temperature conditions. Thus, if the gage blocks and the fasteners are of different temperatures when assembled, upon subsequent equalization of temperatures there may be considerable increase or decrease of compressive or clamping force exerted on the blocks by the fastening elements. This has the effect of rendering the aggregate dimension of the assembled blocks inaccurate and unreliable. There are additional difficulties involved with ordinary gage blocks in the common practice of effecting assembly of a plurality of blocks by either of two methods. For example, one method effects a stack of blocks in a frame and by means of screw pressure compresses the blocks together to effect an overall gage dimension. In another method, used with so-called "Hoke" blocks, the blocks are provided with a hole and a rod is passed through a stack of blocks, nuts on threaded sections of the rod are used to clamp the blocks together. In both of these methods, the clamped blocks act as a beam or a column under an end load which produces inaccuracies due to deflection caused by bending forces. This is particularly so where the blocks are relatively long, i.e., transversely of the direction of compressive stress produced by the rod at their mid-sections, if joints exist near the center of the block stack, or if the point of compressive stress is eccentric to the center of the block cross sections.

A further inaccuracy is introduced in the assembling of a plurality of gage blocks of the type described hereinabove or even of the type shown in my prior patent, in that a certain amount of the torque used to turn a screwdriver or wrench in clamping the blocks together is absorbed by friction of the mating threads or whatever types of fastening elements are used. To some extent, this can be controlled by proper surface finishing of such threads or surfaces of elements and blocks coacting therewith, but only to a limited degree.

No prior system except my micrometer height gage used controlled torque for assembly. If thread fits are controlled, the results are very uniform. I have found that in practice I can control assembly so that a variation of not more than 10 millionths of an inch in 40 blocks occurs due to variation in clamping force.

Thus, in gage block assemblies and the use thereof, where errors in the range of millionths of an inch are given consideration, it can be seen that such extreme accuracy is not normally possible with prior art arrangements.

Accordingly, it is an object of the present invention to provide a system of gage blocks and fastening elements which overcome the above drawbacks. It is another object of the invention to provide fastening elements of very simple and economical construction.

Briefly, my invention comprises the utilization of non-metallic washers of low coefficient of friction and of suitable resiliency to take compressive stresses exerted by the fastening elements on the gage blocks. Specifically, such washers should be of a material having a low modulus of elasticity as compared with the moduli of the material of the blocks and the fastening elements. The modulus of elasticity of the washer must be low compared to that of steel. I have found that nylon is a satisfactory material for the washers and I provide a construction wherein each of the fastening elements carries its own washer. In one modification of the invention where short blocks are used, I have found that good accuracy despite temperature changes can be accomplished by the use of short fastening elements which do not pass through the blocks but extend from block to block at adjoining surfaces. In such instances, where the blocks are short and the fastening elements relatively short, the use of nylon washers may not be necessary from the standpoint of temperature compensation for the overall assembly. However, such use is beneficial for reducing the friction that must be overcome by the torque-measuring tool in clamping of the assembly together. Thus, it is possible to more accurately calculate the actual compressive stress on the blocks in order to ascertain or estimate the final overall dimension.

In the manufacture of the blocks, there is a pre-compensation, in the final lapping, for loss of dimension due to compression. Thus, it might be necessary to lap each block longer by several millionths of an inch for each inch of dimension of that block in order for the block to be at exact dimension under a particular compressive stress. This would not be significant for short blocks but it is important for long blocks. It will be apparent that such extreme accuracy in manufacture would be nullified by inaccurately estimated compressive stresses due to the measured torque force being applied becoming meaningless where considerable friction must be overcome in the threads of the fastening elements.

A detailed description of my invention will now be given in conjunction with the appended drawing in which:

FIGURE 1 is a cross section of an elevation of a gage, for example, a snap gage utilizing gage blocks and fastening elements in accordance with the principles of the invention;

FIGURE 2 is a plan view of FIGURE 1;

FIGURE 3 is a longitudinal section of a fastening element;

FIGURE 4 is a plan view of a nylon washer as used in conjunction with the fastening element;

FIGURE 5 is a longitudinal section of the washer;

FIGURES 6, 7, 8, 9 and 10 are longitudinal cross sections in elevation of various types of gages illustrating the principles of the invention;

FIGURE 13 is an elevation partially in section of an additional example of the use of the invention;

FIGURE 14 is an elevation in section of a generally modified type of fastening element;

FIGURE 15 is a plan view of said fastening element;

FIGURE 16 is an elevation in section of a component used in conjunction with the fastening element;

FIGURE 17 is a plan view thereof;

FIGURE 18 is an elevation in section of an assembled gage which uses the modified fastening element.

Figure 11:
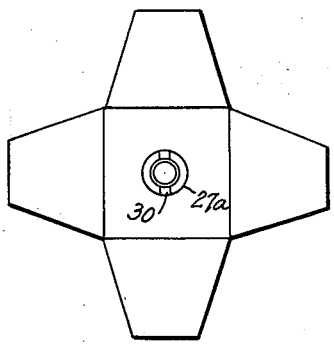
FIGURE 11 is a plan view of the gage of FIGURE 10.

Referring to the drawing, and particularly to FIGURES 1 through 5, a gage is shown comprising an end slip 10 at one end of the structure and an end slip 14 at the other end thereof and intermediate gage blocks 17 and 20, of counterbored construction and so-called "Hoke" blocks 24.

The assembly is maintained by means of fastening elements, such as hermaphrodite bolts 27a, 27b, and 27c, all of differing length. Thus, the bolts function as described in my Patent 2,766,531 hereinabove mentioned. In this instance, however, the bolts engage each other and compressively stress the several blocks. Thus, it will be noted that bolt 27a screws into bolt 27b which in turn screws into bolt 27c which ultimately screws into the end slip 14. The bolts are provided with slots, such as 30, to take torque measuring wrenches or screw-drivers, etc. Each bolt carries a nylon washer 33 in an undercut recess 36 just above the threaded shank 40. The washer is provided with a taper inner lip 43 and each washer may be screwed onto its respective bolt until the lip goes past the threaded shank and into the recess 46. The resiliency of the lip permits it to be expanded while being threaded onto the bolt and to drop into the recess so that the washer is substantially locked in the recess but sufficiently loose so that the bolt has relative rotation with respect thereto under torque applying stress in assembling the gage blocks. Thus, the nylon washers effect low friction thrust bearings between shoulders 47 and 48 on the bolts and in the blocks respectively.

From the above description, it will be apparent that an assembly of gage blocks, as shown in FIGURE 1, may be secured together with a minimum of friction to be overcome at the time the fastening elements are rotated. It will also be apparent that assuming unequal temperatures of components at the time of assembly, should the fastening elements expand relative to the gage blocks, during temperature equalization, initial compression of the resilient washers will permit them to expand rather than lose compression of the gage blocks. Should the gage blocks expand relative to the fasteners, during temperature equalization, the washers will compress to maintain approximately uniform compression. Thus, relative expansions or contractions of the fastening elements or of the gage blocks is absorbed by the compensating effect of the washers. The final end result is that the distance between the end slips 10 and 14 remains substantially the same within ordinary working conditions and ambient temperatures existing at the time of assembly, for all practical purposes, and to an accurate degree heretofore unknown in prior art construction.

Figure 9:
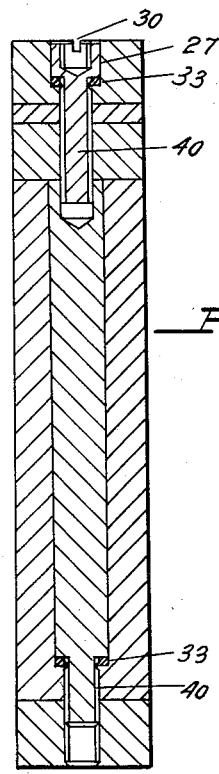
Figure 10:
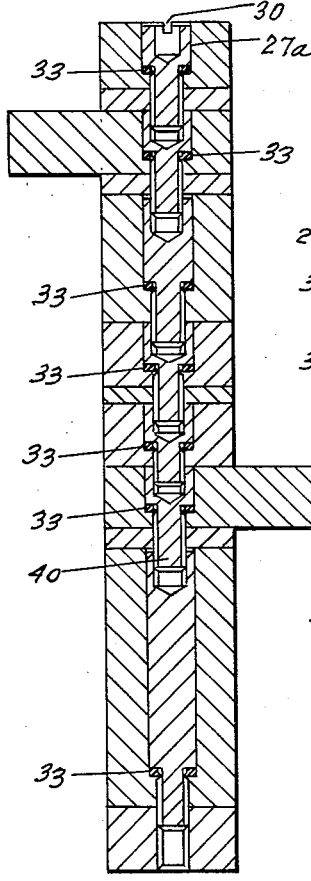
Figure 12:
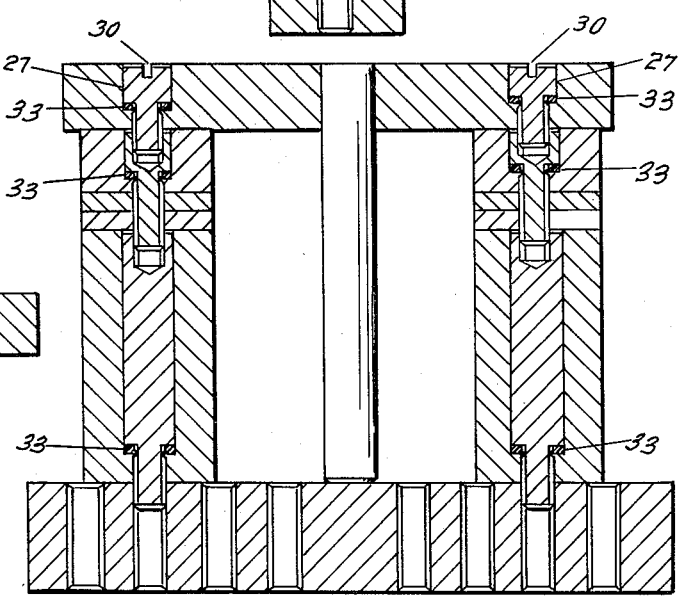
FIGURE 12 is an elevation in section of a still further type of gage grinding and checking tool made from this type of assembled gage block.

In connection with FIGURES 6 through 10, some of the wide variety of gages to which my invention may be applied is illustrated. Thus, FIGURE 6 is a scribing gage; FIGURE 7 is a slot location gage; FIGURE 8 is a gage somewhat similar to that of FIGURE 1 being a snap gage or a bore gage, or setting gage for an internal measuring machine; FIGURE 9 is a simple gage block assembly and FIGURES 10 and 11 show a multi-level gage wherein various gage blocks extend at different horizontal angles; FIGURE 12 is a master gage for grinding and checking flush pin gages; FIGURE 13 is another type of multi-level gage or stepped measuring bar of the kind shown in my previously mentioned patent. The existence of the washer 33 is indicated in an exemplary way in each of the gages illustrated and it will be understood that the fastening elements, showing a wide variety of lengths, are all constructed in accordance with FIGURE 3 as heretofore described, each of such fastening elements carrying its own nylon washer.

Refering now to the modification shown in FIGURES 13 through 18, the gage comprises end slips 50 and 53, a plurality of gage blocks, such as 56a, 56b, 56c and "Hoke" blocks 60. In this instance, however, the fastening elements are exceedingly short and do not pass through the blocks. Thus, a fastening element, such as 64 (FIGURE 14) is provided with a head 67 which engages the shoulder of a counter-bore provided in one end of each block, as shown, through a washer such as 33 maintained in a recess of the bolt in the manner hereinabove described in connection with FIGURE 3. Actually, such short fastening elements as 64 can, for practical purposes, be used without the washers because the degree of contraction or expansion effected by temperature would be very small and further the change in stress is completely localized to the adjoining ends of the blocks. However, the washers lessen the friction in tightening the bolts and therefore increase torque determining accuracy. Each fastening element screws into a nut 70 (FIGURE 16) which in turn is threaded in a bore of the block, in each instance. Accordingly, any change in stress of a fastening element cannot be transmitted through an entire block but can only be felt in the material directly adjoining the block ends. Such construction minimizes the need for lapping the blocks to an oversize dimension in manufacture because the region of block compression is considerably reduced as compared with overall compression when the fastening elements extend through the blocks.

Having thus described my invention, I am aware that various changes may be made without departing from the spirit thereof and, therefore, do not seek to be limited to the precise illustrations herein given, except as set forth in the appended claims.

I claim:

1. In a gage block assembly, a plurality of gage blocks, means for joining said gage blocks comprising fastening means including a fastening element extending between individual ones of said blocks and effecting a compressive stress, and a compressible washer, intermediate the length of said gage block assembly, in resilient force transmission relationship between said element and at least one of said blocks for resiliently transmitting compressive stress from said element thereto.

2. In an assembly as set forth in claim 1, said fastening element having an undercut at an intermediate region thereof and said washer being retained in said undercut.

3. In an assembly as set forth in claim 1, individual ones of said fastening elements extending substantially through individual gage blocks of said gage block assembly, and projecting into an adjacent gage block.

4. In an assembly as set forth in claim 1, said washer being comprised of a resilient material having a modulus of elasticity low compared to the material forming said gage blocks and fastening means, said washer having a lip extending radially into the aperture thereof, said fastening element having an undercut and having a threaded section there-beyond for projecting into an adjacent gage block, said washer being rotatable on said threaded section with said lip disposed in the threads thereof whereby said washer may be threadedly actuated along said threaded section until the lip moves into said undercut to retain said washer on said fastening element.

5. A fastening element for securing a plurality of gage blocks comprising a hermaphrodite bolt having a head section and a threaded section and an undercut recess between said sections intermediate the length of said fastening element, and a washer of compressible material retained in said recess.

6. A fastening element as set forth in claim 5 wherein the material of said washer is nylon.

7. A gage block assembly as set forth in claim 4, wherein said washer being formed of nylon.

8. A fastening element as set forth in claim 5, wherein said washer is formed of a resilient material having a modulus of elasticity low compared to said hermaphrodite bolt.

9. In a gage block assembly as set forth in claim 1, wherein said compressive washer is located at the region whereat adjacent ones of said gage blocks are joined.

10. In a gage block assembly, a plurality of gage blocks, means for joining said gage blocks at abutting surfaces thereof, said means comprising an individual fastening element for joining adjacent gage blocks in successive relationship, said fastening element extending through substantially the entire length of one of the gage blocks to be secured, and projecting into the adjacent gage block to be secured to said one gage block, means having a lower modulus of elasticity than the said fastening element for resiliently compensating said gage block assemblies for differential temperature expansion between said fastening element and said gage blocks.

11. In a gage block assembly as set forth in claim 10, wherein said last-mentioned means comprises a resilient washer member located at an intermediate region of said fastening element, said resilient washer member being formed of material having a modulus of elasticity low compared to the material forming said gage blocks and fastening means.

12. In a gage block assembly as set forth in claim 10, wherein said material forming said resilient washer is nylon.

References Cited by the Examiner
UNITED STATES PATENTS 2,761,347  9/56  McKee _____ 85—1

FOREIGN PATENTS 140,684  4/20  Great Britain.

ISAAC LISANN, *Primary Examiner.*